US009659156B1

(12) United States Patent
Jing et al.

(10) Patent No.: US 9,659,156 B1
(45) Date of Patent: May 23, 2017

(54) SYSTEMS AND METHODS FOR PROTECTING VIRTUAL MACHINE PROGRAM CODE

(71) Applicant: Symantec Corporation, Mountain View, CA (US)

(72) Inventors: Rui Jing, Los Angeles, CA (US); Xue Feng Tian, Beijing (CN)

(73) Assignee: Symantec Corporation, Mountain View, CA (US)

( * ) Notice: Subject to any disclaimer, the term of this patent is extended or adjusted under 35 U.S.C. 154(b) by 129 days.

(21) Appl. No.: 14/221,267

(22) Filed: Mar. 20, 2014

(51) Int. Cl.
*G06F 12/14* (2006.01)
*G06F 21/14* (2013.01)
*G06F 21/12* (2013.01)

(52) U.S. Cl.
CPC .............. *G06F 21/14* (2013.01); *G06F 21/12* (2013.01)

(58) Field of Classification Search
None
See application file for complete search history.

(56) References Cited

U.S. PATENT DOCUMENTS

| | | | | |
|---|---|---|---|---|
| 6,006,328 A * | 12/1999 | Drake | ...................... | G06F 21/14 713/188 |
| 6,643,775 B1 * | 11/2003 | Granger | ................ | G06F 21/123 380/255 |
| 6,782,532 B1 * | 8/2004 | Sexton | ...................... | G06F 8/24 706/13 |
| 8,887,152 B1 * | 11/2014 | Chen et al. | .................... | 717/174 |
| 8,892,876 B1 * | 11/2014 | Huang | ................ | G06F 21/6218 713/165 |
| 8,984,299 B1 * | 3/2015 | Yi | ........................... | G06F 21/14 713/189 |
| 9,396,313 B2 * | 7/2016 | Yi | ........................ | G06F 21/125 |
| 2004/0003264 A1 * | 1/2004 | Zeman et al. | ................ | 713/190 |
| 2004/0003380 A1 * | 1/2004 | Fedorov | ............. | G06F 9/44589 717/148 |
| 2004/0103404 A1 * | 5/2004 | Naumovich | ........... | G06F 21/14 717/136 |
| 2006/0123403 A1 * | 6/2006 | Bruecklmayr et al. | ....... | 717/136 |

(Continued)

OTHER PUBLICATIONS

Grace et al., "RiskRanker: Scalable and Accurate Zero-day Android Malware Detection", Jun. 2012, ACM, pp. 281-293.*

(Continued)

*Primary Examiner* — Farid Homayounmehr
*Assistant Examiner* — Olanrewaju Bucknor
(74) *Attorney, Agent, or Firm* — FisherBroyles LLP

(57) ABSTRACT

A computer-implemented method for protecting virtual machine program code may include (1) identifying one or more software program functions developed for execution in a virtual machine to be protected against reverse engineering, (2) converting one or more of the software program functions to native code for the computing device, (3) obtaining a memory address of one or more virtual machine functions, (4) generating one or more at least partially random alphanumeric values to identify the memory address of the virtual machine functions, (5) invoking the converted native code using a native code interface for the virtual machine, and (6) invoking one or more of the virtual machine functions from the converted native code using the alphanumeric value. Various other methods, systems, and computer-readable media are also disclosed.

20 Claims, 5 Drawing Sheets

(56) References Cited

U.S. PATENT DOCUMENTS

| | | | |
|---|---|---|---|
| 2007/0256061 A1* | 11/2007 | Victorov | G06F 21/125 |
| | | | 717/141 |
| 2010/0313188 A1* | 12/2010 | Asipov | G06F 21/125 |
| | | | 717/139 |
| 2012/0059993 A1* | 3/2012 | Haselsteiner et al. | 711/115 |
| 2012/0159193 A1* | 6/2012 | Spradlin | G06F 21/51 |
| | | | 713/190 |
| 2012/0284792 A1* | 11/2012 | Liem | G06F 21/52 |
| | | | 726/22 |
| 2013/0227688 A1* | 8/2013 | Kim | G06F 21/64 |
| | | | 726/23 |
| 2014/0115292 A1* | 4/2014 | McLachlan | G06F 12/02 |
| | | | 711/170 |
| 2014/0137184 A1* | 5/2014 | Russello et al. | 726/1 |
| 2014/0351947 A1* | 11/2014 | Shim et al. | 726/26 |
| 2015/0143452 A1* | 5/2015 | Hamlen | 726/1 |
| 2015/0154407 A1* | 6/2015 | Yi | G06F 21/14 |
| | | | 713/194 |
| 2015/0161363 A1* | 6/2015 | Mallon | 726/26 |

OTHER PUBLICATIONS

Li et al., "Android Malware Forensics: Reconstruction of Malicious Events", 2012, IEEE Computer Society, pp. 552-558.*

Schulz, Patrick, "Code Protection in Android", http://net.cs.uni-bonn.de/fileadmin/user_upload/plohmann/2012-Schulz-Code_Protection_in_Android.pdf, as accessed Jan. 30, 2014, Lab Course: Communication and Communicating Devices, Winter term Dec. 2011, Rheinische Friedrich-Wilhelms-Universität, Bonn, Germany, (Jun. 7, 2012).

* cited by examiner

SYSTEMS AND METHODS FOR PROTECTING VIRTUAL MACHINE PROGRAM CODE

BACKGROUND

Developing and marketing software typically involves a significant investment of time and money. Even when software is distributed as freeware or inexpensive shareware, software developers have an interest in being recognized as the developer of the software and maintaining the rights of ownership of their intellectual property.

A number of actors work against the rights of software developers. Competitors may reverse engineer a piece of software to learn how it operates. Others may exploit a software developer's work by modifying executable code for their own purposes, such as to display advertisements for their own products. Malware developers may also crack a legitimate program and modify it to distribute malware. Software developed for virtual machines may be particularly vulnerable to exploits of these types, due to the close relationship between modern high-level languages and virtual machines designed to execute object code generated from programs written in these languages. Accordingly, the instant disclosure identifies and addresses a need for additional and improved systems and methods for protecting virtual machine program code.

SUMMARY

As will be described in greater detail below, the instant disclosure describes various systems and methods for protecting virtual machine program code by converting program functions to native code for a computing device, obtaining memory addresses of virtual machine and/or operating system functions to be called from the functions converted to native code, and generating random or partially-random identifiers to reference the memory addresses. Native code functions may be invoked using a native code interface for the virtual machine, and native code functions may then invoke virtual machine and/or operating system functions using the random identifiers.

In one example, a computer-implemented method for protecting virtual machine program code may include (1) identifying at least one software program function developed for execution in a virtual machine to be protected against reverse engineering, (2) converting the software program function to native code for a computing device, (3) obtaining a memory address of at least one virtual machine function, (4) generating an at least partially random alphanumeric value to identify the memory address of the virtual machine function, (5) invoking the converted native code using a native code interface for the virtual machine, and (6) invoking the virtual machine function from the converted native code using the alphanumeric value.

In some examples, converting the software program function to native code for the computing device may include (1) converting the source code for the software program function to a second programming language and (2) compiling the converted source code to native code for the computing device. In one embodiment, the second programming language may be C, C++, BASIC, SIMPLE, and/or SAPHIR.

In one embodiment, the virtual machine may include a JAVA virtual machine. In some examples, obtaining the memory address of the virtual machine function may include using a JAVA REFLECTION interface to obtain the memory address of the virtual machine function. In one embodiment, the computer-implemented method may further include (1) obtaining a memory address of one or more operating system functions, (2) generating an at least partially random alphanumeric value to identify the memory address of the operating system function, and (3) invoking the operating system function from the converted native code using the alphanumeric value. In one embodiment, the operating system may be an ANDROID operating system.

In some examples, the computer-implemented method may further include halting execution of the software program if a public key for the software program does not authenticate a signing certificate for the software program. In some examples, the computer-implemented method may further include obfuscating input of one or more functions called from the converted native code.

In one embodiment, a system for implementing the above-described method may include several modules stored in memory, such as (1) an identification module that identifies at least one software program function developed to be executed in a virtual machine to be protected against reverse engineering, (2) a conversion module that converts the software program function to native code for a computing device, (3) an addressing module that obtains a memory address of at least one virtual machine function, (4) a reference module that generates at least partially random alphanumeric values to identify the memory address of the virtual machine function, (5) a native interface module that invokes the converted native code using a native code interface for the virtual machine, (6) a system interface module that invokes the virtual machine function from the converted native code using the alphanumeric values. The system may also include one or more processors configured to execute the identification module, the conversion module, the addressing module, the reference module, and the native interface module.

In some examples, the above-described method may be encoded as computer-executable instructions on a non-transitory computer-readable-storage medium. For example, a computer-readable-storage medium may include one or more computer-executable instructions that, when executed by at least one processor of a computing device, may cause the computing device to (1) identify at least one software program function developed for execution in a virtual machine to be protected against reverse engineering, (2) convert the software program function to native code for the computing device, (3) obtain a memory address of at least one virtual machine function, (4) generate an at least partially random alphanumeric value to identify the memory address of the virtual machine function, (5) invoke the converted native code using a native code interface for the virtual machine, and (6) invoke the virtual machine function from the converted native code using the alphanumeric value.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
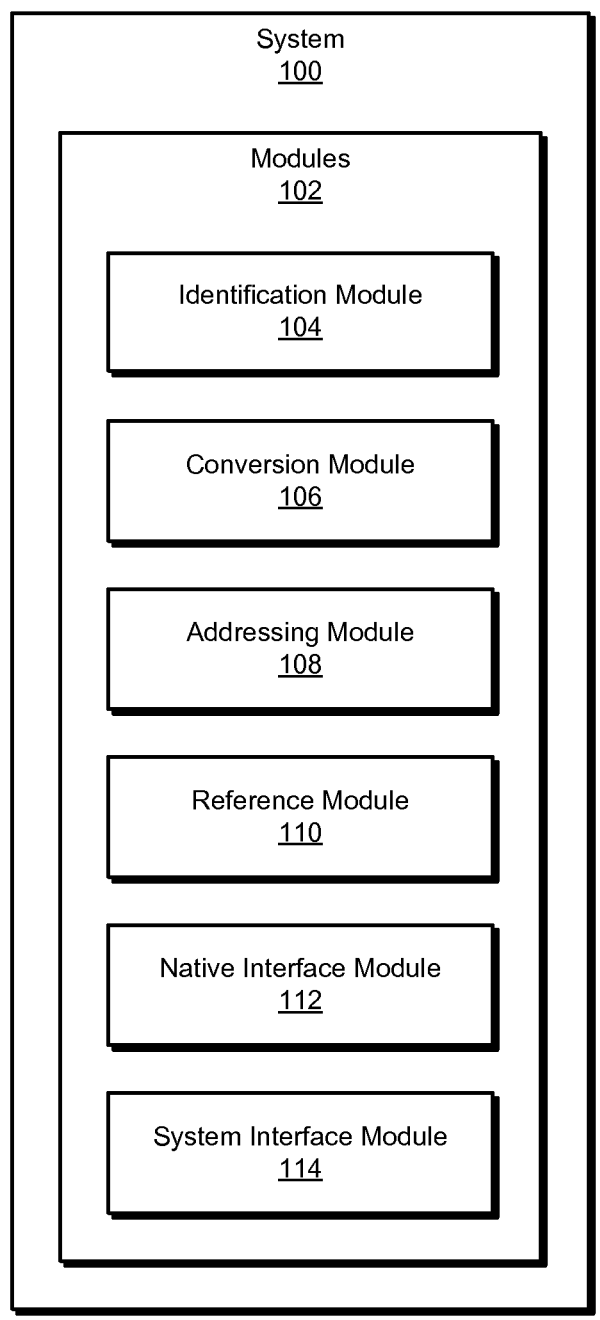
FIG. 1 is a block diagram of an exemplary system for protecting virtual machine program code.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting virtual machine program code. As will be explained in greater detail below, systems and methods described herein may protect virtual machine program code from reverse engineering by converting one or more functions of a software program to native code for the computing device on which the program is intended to run. The software program may then obtain memory addresses of native code functions in order to invoke the native code functions during program execution. Native code functions may likewise obtain the memory addresses of virtual machine or operating system functions in order to invoke these functions. Virtual machine or operating system functions may be referenced using a partially random alphanumeric identifier.

Using these systems and methods may provide several advantages. For example, the combination of virtual machine and native code may make the software program more difficult to reverse engineer, potentially requiring familiarity with multiple code analysis tools and operating environments. Using random alphanumeric identifiers when invoking virtual machine or operating system functions may obscure which functions are being called. These advantages may be realized particularly in an operating environment where reverse engineering tools are less sophisticated and where software development techniques are less widely known, such as for a mobile device.

Figure 2:
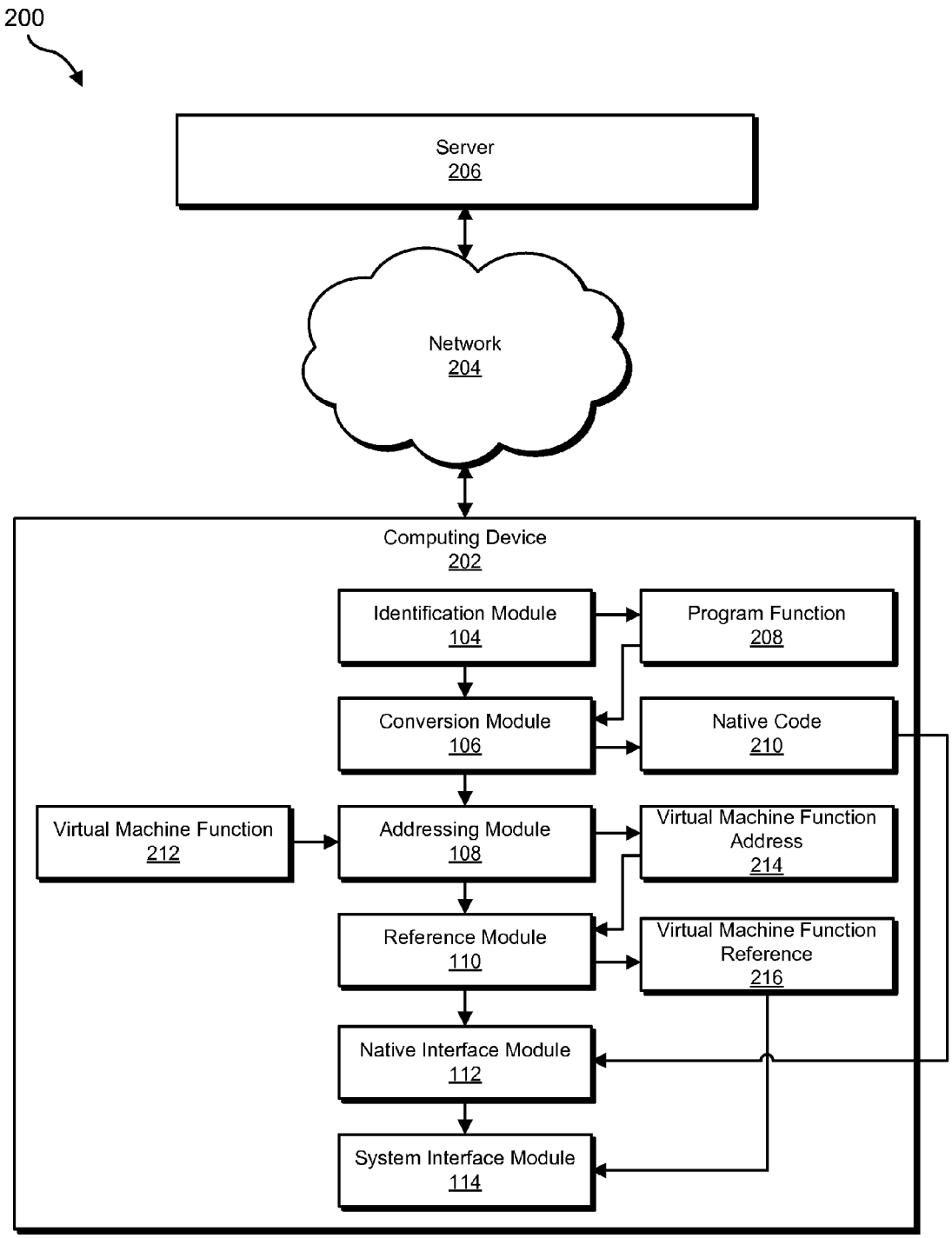
FIG. 2 is a block diagram of an additional exemplary system for protecting virtual machine program code.

The following will provide, with reference to FIGS. 1 and 2, detailed descriptions of exemplary systems for protecting virtual machine program code. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of exemplary system 100 for protecting virtual machine program code. As illustrated in this figure, exemplary system 100 may include one or more modules 102 for performing one or more tasks. For example, and as will be explained in greater detail below, exemplary system 100 may also include an identification module 104 that may identify at least one software program function to be protected against reverse engineering, where the software program function is developed for execution in a virtual machine. Exemplary system 100 may additionally include a conversion module 106 that may convert the software program function to native code for a computing device.

In addition, exemplary system 100 may include an addressing module 108 that may obtain a memory address of at least one virtual machine function. Exemplary system 100 may additionally include a reference module 110 that may generate an at least partially random alphanumeric value to identify the memory address of the virtual machine function. Exemplary system 100 may also include a native interface module 112 that may invoke the converted native code using a native code interface for the virtual machine. Native interface module 112 may further invoke the virtual machine function from the converted native code using the alphanumeric value. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to protect virtual machine program code. For example, and as will be described in greater detail below, identification module 104 may be programmed to identify one or more software program functions 208 developed for execution in a virtual machine to be protected against reverse engineering. Conversion module 106 may be programmed to convert software program function 208 to native code 210 for computing device 202. Addressing module 108 may be programmed to obtain virtual machine function address 214 of one or more virtual machine functions 212. Reference module 110 may be programmed to generate an at least partially random alphanumeric value to identify virtual machine function address 214 as virtual machine function reference 216. Native interface module 112 may be programmed to invoke converted native code 210 using a native code interface for the virtual machine. Native interface module 112 may be programmed to invoke virtual machine function 212 from converted native code 210 using virtual machine function reference 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
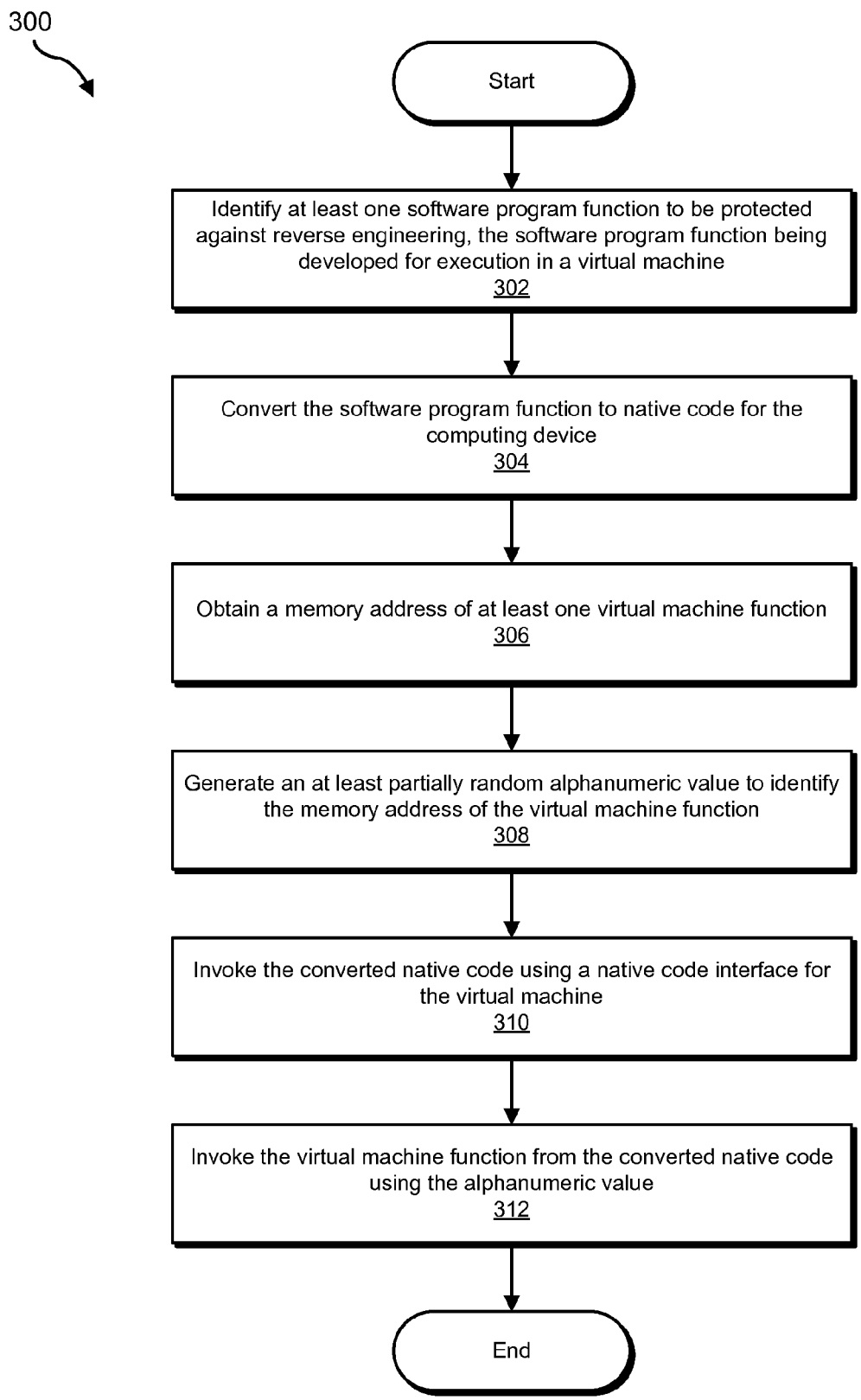
FIG. 3 is a flow diagram of an exemplary method for protecting virtual machine program code.

FIG. 3 is a flow diagram of an exemplary computer-implemented method 300 for protecting virtual machine program code. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may identify one or more software program functions that were developed for execution in a virtual machine and that are to be protected against reverse engineering by converting the software program functions to native code for the computing device. For example, at step 302 identification module 104 may, as part of computing device 202 in FIG. 2, identify one or more software program functions 208 to be protected against reverse engineering.

Identification module 104 may select the software program functions to be protected against reverse engineering based on a number of criteria and in any suitable manner. For example, identification module 104 may base the selection of program functions to be converted to native code for the computing device on an analysis of the structure of the software program. Smaller programs or programs with a monolithic structure may be converted to native code in their entirety, with just a program stub remaining in the original programming language to call the converted program function. Other programs may be decomposed into major program functions, with each of the program functions being converted into separate native code functions and a main program remaining in the original programming language that calls the converted program functions in the appropriate sequence, or in response to received events.

At step 304 one or more of the systems described herein may convert the software program function to native code for the computing device. For example, at step 304 conversion module 106 may, as part of computing device 202 in FIG. 2, convert software program function 208 to native code 210 for computing device 202.

The phrase "native code," as used herein, generally refers to numerical code compiled or assembled to be executed directly by a computing device's central processing unit (CPU). Native code differs from interpreted code, which is executed by another software program called an interpreter, or from virtual machine code, which is executed by a virtual machine, which may itself be implemented in native code. The term "compiling," as used herein, generally refers to the process of converting a high level language to the native code for a CPU. Common usage typically differentiates compiling from assembling (which is the process of converting a low-level assembly language to machine code) but as used herein, "compiling" may refer to either process.

Conversion module 106 may convert selected program functions to native code in any suitable manner. In some examples, converting the software program function to native code for the computing device may include (1) converting the source code for the software program function to a second programming language and (2) compiling the converted source code to native code for the computing device. Conversion module 106 may use an automated translation tool to convert the source code for the software program function to a second programming language, or the software program developer may choose to rewrite the selected program function in the second programming language.

In various embodiments, the second programming language may be C, C++, BASIC, SIMPLE, SAPHIR, or any other available programming language. One software program may combine program functions developed in any combination of programming languages, according to the needs of the software program developer. Since compilers for different programming languages may produce significantly different native machine code, developing program functions for a single software program in multiple programming languages may add additional complexity to the reverse engineering process.

At step 306 one or more of the systems described herein may obtain a memory address of one or more virtual machine functions. For example, at step 306 addressing module 108 may, as part of computing device 202 in FIG. 2, obtain virtual machine function address 214 for virtual machine function 212.

Addressing module 108 may obtain a memory address of a virtual machine function in a variety of ways. For example, in one embodiment, the virtual machine may include a JAVA virtual machine. Addressing module 108 may obtain the memory address of a JAVA virtual machine function using a JAVA REFLECTION interface. The phrase "JAVA REFLECTION," as used herein, generally refers to an application programming interface (API) of the JAVA programming language that implements the feature of object-oriented languages known as introspection. Introspection enables the development of anonymous classes with runtime loading and binding. At runtime, addressing module 108 may use the REFLECTION API to discover methods of a JAVA class that is part of a JAVA virtual machine (JVM) or JAVA library function.

In some examples, systems described herein may include obfuscating input of at least one function called from the converted native code. For example, addressing module 108 may obfuscate parameters passed to the JAVA REFLECTION FindClass or GetMethodID functions when obtaining the address of virtual machine functions. Obfuscating the names of the functions may increase the difficulty of reverse engineering the software program by obscuring which functions in the virtual machine are called from the native code function.

At step 308 one or more of the systems described herein may generate an at least partially random alphanumeric value to identify the memory address of a virtual machine function. For example, at step 308 reference module 110 may, as part of computing device 202 in FIG. 2, generate an at least partially random alphanumeric value to be used as virtual machine function reference 216 to identify virtual machine function 212 located at virtual machine function address 214.

Reference module 110 may use any suitable mechanism to generate a random or partially random alphanumeric value to identify the memory address of a virtual machine function. For example, reference module 110 may use a random string function provided by a programming library. The operating system running on the computing device may also provide a function for generating random alphanumeric strings. Reference module 110 may also construct a suitable random identifier by combining an initial alphabetic character with a random number generated by a random number generating function.

At step 310 one or more of the systems described herein may invoke the converted native code using a native code interface for the virtual machine. For example, at step 310 native interface module 112 may, as part of computing device 202 in FIG. 2, invoke the converted native code 210 for program function 208 using a native code interface for the virtual machine.

Native interface module 112 may invoke the converted native code in a variety of ways. In one example, native interface module 112, running in a JAVA virtual machine, may invoke the native code for a program function using the JAVA NATIVE INTERFACE (JNI). Using JNI or a similar native interface for another programming language provides the advantage of mapping the data types of parameters passed between the high level function and the native code function. For parameters of compound types such as objects, arrays, and strings, JNI provides an interface (JNIEnv) the native code function may call to convert the parameters to appropriate data types for the native code function.

At step 312 one or more of the systems described herein may invoke the virtual machine function from the converted native code using the alphanumeric value. For example, at step 312 system interface module 114 may, as part of computing device 202 in FIG. 2, invoke the virtual machine function 212 located at virtual machine function address 214 from converted native code 210 for program function 208 using virtual machine function reference 216.

System interface module 112 may invoke the virtual machine function in any suitable manner. For example, system interface module 112 may maintain a table associating each partially random alphanumeric value with a virtual machine function address, with a function provided to retrieve the function address matching a given alphanumeric value. The alphanumeric value may vary each time the software program runs, making the process of reverse engineering the function call sequence much more difficult.

In one embodiment, systems described herein may manage the process of invoking operating system functions in much the same manner used to invoke virtual machine functions. For example, invoking an operating system function may include (1) obtaining the memory address of at least one operating system function, (2) generating an at least partially random alphanumeric value to identify the memory address of the operating system function, and (3) invoking the operating system function from the converted native code using the alphanumeric value. In one embodiment, the operating system may be a version of the ANDROID operating system, and systems and methods described herein may obtain the memory address of a random number generating function of the ANDROID operating system.

In some examples, methods described herein may include halting execution of the software program if a public key for the software program does not authenticate a signing certificate for the software program. Systems and methods described herein may obtain a public key for the software program from a certificate authority and attempt to authenticate a code signing certificate for the software program. Authentication may take place either in the virtual machine or in a program function converted to native code. By attempting to authenticate the software program using a signing certificate, systems and methods described herein may detect when the software program has been modified and take appropriate action, such as halting execution of the software program.

As explained above, the systems and methods described herein may protect virtual machine program code from reverse engineering by converting one or more functions of a software program to native code for the computing device on which the program is intended to run. The software program may then obtain memory addresses of native code functions in order to invoke the native code functions during program execution. Native code functions may also obtain the memory addresses of virtual machine or operating system functions in order to invoke these functions. Virtual machine or operating system functions may be referenced using a partially random alphanumeric identifier.

Combining virtual machine and native code may increase the complexity of reverse engineering a software program. Additional complexity may be added by using random alphanumeric identifiers when invoking virtual machine or operating system functions from native code program functions and by obfuscating parameters passed to virtual machine functions. Systems and methods described herein may also protect the software program from tampering or being modified by halting execution of the software program if the software program cannot be authenticated with a public key and signing certificate for the software program.

Figure 4:
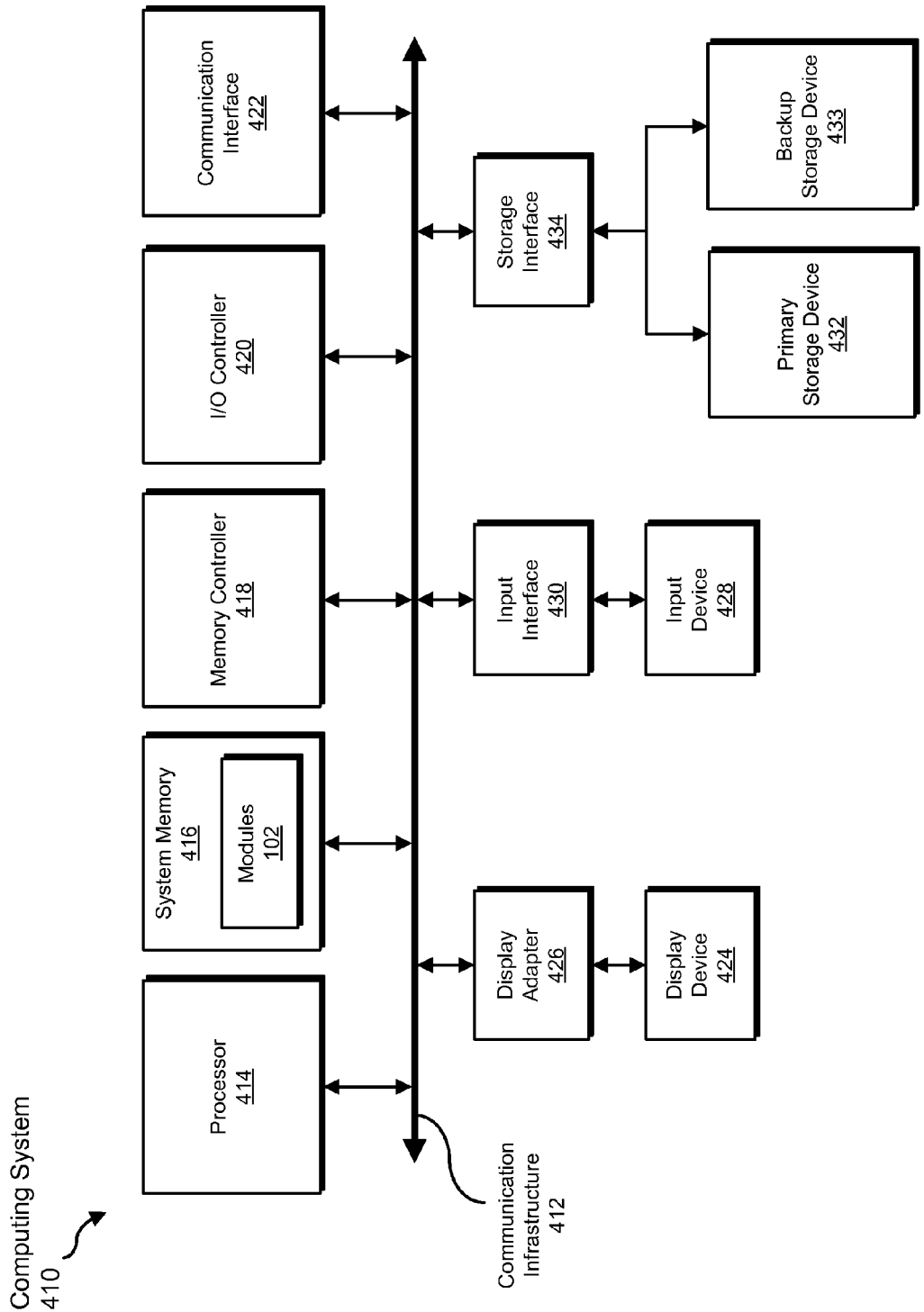
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
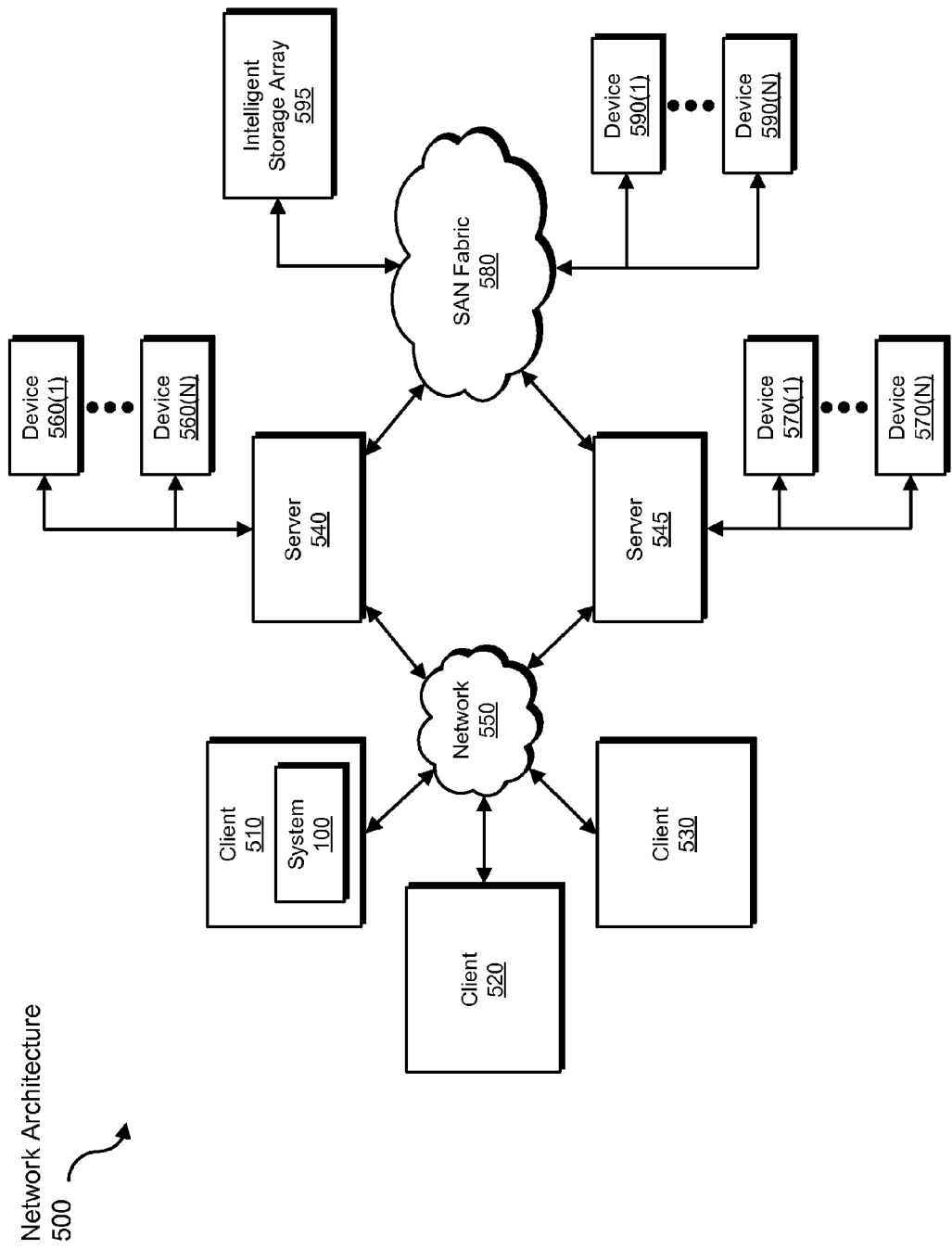
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for protecting virtual machine program code.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive software program source code to be transformed, transform the software program source code to native executable code for a computing device, and output a result of the transformation to a computing device. In another example, one or more of the modules recited herein may transform a computing system into a system for protecting virtual machine program code. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting virtual machine program code, at least a portion of the method being performed by a computing device comprising at least one processor, the method comprising:
   identifying a software program function to be protected against reverse engineering, the software program function being developed for execution in a virtual machine;
   protecting the software program function from reverse engineering by converting the software program function to native code for the computing device, wherein converting the software program function to native code comprises:
   using an automated translation tool to convert source code for the software program function to a second programming language; and
   compiling the converted source code to native code for the computing device;
   obtaining a memory address of at least one virtual machine function;
   generating a random alphanumeric value to identify the memory address of the virtual machine function;
   invoking the converted native code using a native code interface for the virtual machine;
   obfuscating input to be used to invoke the virtual machine function; and
   using obfuscated input to invoke the virtual machine function from the converted native code, while obscuring which of a plurality of functions is being invoked, by invoking the virtual machine function using the random alphanumeric value instead of using the memory address.

2. The computer-implemented method of claim 1, wherein generating the random alphanumeric value comprises using a random string function provided by a programming library to generate the random alphanumeric value.

3. The computer-implemented method of claim 1, wherein the second programming language comprises at least one of:
   C;
   C++;
   BASIC;
   SIMPLE; and
   SAPHIR.

4. The computer-implemented method of claim 1, wherein the virtual machine comprises a JAVA virtual machine.

5. The computer-implemented method of claim 4, wherein obtaining the memory address of the virtual machine function comprises using a JAVA REFLECTION interface to obtain the memory address of the virtual machine function.

6. The computer-implemented method of claim 1, further comprising:
   obtaining a memory address of at least one operating system function;
   generating an additional random alphanumeric value to identify the memory address of the operating system function; and
   invoking the operating system function from the converted native code using the additional random alphanumeric value.

7. The computer-implemented method of claim 6, wherein the operating system function corresponds to an ANDROID operating system.

8. The computer-implemented method of claim 1, further comprising:
   obtaining, from a certificate authority, a public key for a software program corresponding to the software program function;
   attempting to authenticate a code signing certificate for the software program; and
   halting execution of the software program if the public key for the software program does not authenticate the code signing certificate for the software program.

9. The computer-implemented method of claim 1, wherein generating the random alphanumeric value comprises constructing the random alphanumeric value by combining an initial alphabetic character with a random number generated by a random number generating function.

10. A system for protecting virtual machine program code, the system comprising:
    an identification module, stored in memory, that identifies a software program function to be protected against reverse engineering, the software program function being developed for execution in a virtual machine;
    a conversion module, stored in memory, that protects the software program function from reverse engineering by converting the software program function to native code for a computing device, wherein converting the software program function to native code comprises:
    using an automated translation tool to convert source code for the software program function to a second programming language; and
    compiling the converted source code to native code for the computing device;
    an addressing module, stored in memory, that obtains a memory address of at least one virtual machine function;

a reference module, stored in memory, that generates a random alphanumeric value to identify the memory address of the virtual machine function;

a native interface module, stored in memory, that invokes the converted native code using a native code interface for the virtual machine;

a system interface module, stored in memory, that:

obfuscates input to be used to invoke the virtual machine function; and uses the obfuscated input to invoke the virtual machine function from the converted native code, while obscuring which of a plurality of functions is being invoked, by invoking the virtual machine function using the random alphanumeric value instead of using the memory address; and at least one processor configured to execute the identification module, the conversion module, the addressing module, the reference module, the native interface module, and the system interface module.

11. The system of claim 10, wherein the reference module generates the random alphanumeric value using a random string function provided by a programming library.

12. The system of claim 11, wherein the second programming language comprises at least one of:

C;
C++;
BASIC;
SIMPLE; and
SAPHIR.

13. The system of claim 10, wherein the virtual machine comprises a JAVA virtual machine.

14. The system of claim 13, wherein the addressing module obtains the memory address of the virtual machine function using a JAVA REFLECTION interface to obtain the memory address of the virtual machine function.

15. The system of claim 10, wherein:

the addressing module obtains a memory address of at least one operating system function;

the reference module generates an additional random alphanumeric value to identify the memory address of the operating system function; and the system interface module invokes the operating system function from the converted native code using the additional random alphanumeric value.

16. The system of claim 15, wherein the operating system function corresponds to an ANDROID operating system.

17. The system of claim 10, further comprising an authentication module, stored in memory, that halts execution of a software program corresponding to the software program function if a public key for the software program does not authenticate a signing certificate for the software program.

18. The system of claim 10, wherein the reference module generates the random alphanumeric value by combining an initial alphabetic character with a random number generated by a random number generating function.

19. A non-transitory computer-readable-storage medium comprising one or more computer-executable instructions that, when executed by at least one processor of a computing device, cause the computing device to:

identify a software program function to be protected against reverse engineering, the software program function being developed for execution in a virtual machine;

protect the software program function from reverse engineering by converting the software program function to native code for the computing device, wherein converting the software program function to native code comprises:

using an automated translating tool to convert source code for the software program function to a second programming language; and compiling the converted source code to native code for the computing device;

obtain a memory address of at least one virtual machine function;

generate a random alphanumeric value to identify the memory address of the virtual machine function;

invoke the converted native code using a native code interface for the virtual machine;

obfuscate input to be used to invoke the virtual machine function; and use the obfuscated input to invoke the virtual machine function from the converted native code, while obscuring which of a plurality of functions is being invoked, by invoking the virtual machine function using the random alphanumeric value instead of using the memory address.

20. The non-transitory computer-readable-storage medium of claim 19, wherein the second programming language comprises at least one of:

C;
C++;
BASIC;
SIMPLE; and
SAPHIR.

* * * * *